March 10, 1964 F. L. STOLLER 3,124,688
CATALYST DETERMINATION IN THE PRODUCTS OF
CATALYTIC REACTION BY RADIOACTIVE TRACER
Filed Sept. 20, 1956

INVENTOR.
F. L. STOLLER
BY
Hudson & Young
ATTORNEYS

United States Patent Office 3,124,688
Patented Mar. 10, 1964

3,124,688
CATALYST DETERMINATION IN THE PRODUCTS OF CATALYTIC REACTION BY RADIOACTIVE TRACER
Frederick L. Stoller, Bartlesville, Okla., assignor to Phillips Petroleum Company, a corporation of Delaware
Filed Sept. 20, 1956, Ser. No. 610,973
7 Claims. (Cl. 250—106)

This invention relates to a method of and apparatus for determining the presence of catalyst in the products of a catalytic reaction.

In many catalytic reactions, particularly those conducted in the liquid phase, a small amount of catalyst may remain in the product. This residual catalyst may have an adverse effect upon the coloration of the product, or upon its physical properties, for example, electrical properties.

One process where such residual catalyst is particularly important is the catalytic polymerization of ethylene utilizing catalysts such as chromium oxide supported on silica-alumina or various types of organometal catalysts.

In accordance with this invention, a radioactive isotope is incorporated in the catalyst fed to the process, and the radioactivity of the resulting product is determined. This provides a measure of the amount of catalyst appearing in the product. As is well known, the activity of radioactive material decreases exponentially with time. It is a feature of the invention that this decrease is compensated for, so that the output, which can be utilized to actuate a recorder or alarm device, is representative of the true quantity of radioactivity in the reaction product and, hence, of the amount of catalyst therein.

In the liquid-phase catalytic polymerization of ethylene with a supported chromium oxide catalyst, the tracer can advantageously be the radioactive isotope chromium-51 which is added to the catalyst during its preparation. With organometal catalysts incorporating materials such as titanium tetrachloride, the radioactive isotope can be a radioactive titanium isotope, such as titanium-51.

Accordingly, it is an object of the invention to provide an accurate method for determining the presence of catalyst in products of a catalytic reaction.

It is a further object to accurately determine the amount of chromium oxide or organo-metal catalyst present in a polyethylene or other olefin polymer produced by liquid-phase catalytic polymerization.

It is a still further object to provide a process which is readily applied with a minimum expenditure for apparatus, and which gives rapid and accurate results.

Various other objects, advantages and features of the invention will become apparent from the following detailed description taken in conjunction with the accompanying drawings, in which.

Figure 1:
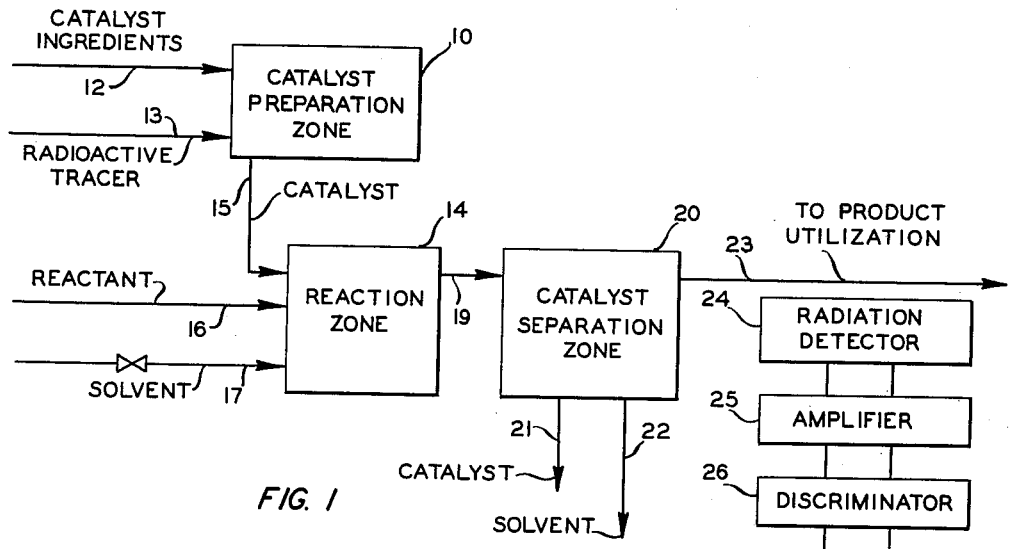
FIGURE 1 is a block diagram of a catalytic reaction system embodying the method of the invention.

Referring now to the drawings in detail, catalyst ingredients and a radioactive tracer are fed to a catalyst preparation zone 10 through lines 12 and 13, respectively. In this zone, a predetermined amount of radioactive material is incorporated in the catalyst.

Where the catalyst is chromium oxide deposited on a silica-alumina base, a predetermined proportion of a solution of a chromium salt or oxide of the isotope chromium-51 is admixed with the chromium oxide solution or solution of a chromium salt convertible to the oxide on calcination utilized to impregnate the base, which can be silica, silica-alumina, thoria, or zirconia. After impregnation, the catalyst is treated in an oxidating atmosphere for three to ten hours at a temperature of 750–1500° F. in the absence of water. The amount of radioactive chromium to be utilized is dependent only upon economics and safety considerations. In general, the amount of radioactive chromium present varies from 0.001 percent by weight to 0.1 percent by weight of the total chromium present.

From the preparation zone 10, the catalyst is fed to a reaction zone 14 through a line 15. A reactant, for example an aliphatic monoolefin containing up to 8 carbon atoms such as ethylene, is fed to the reaction zone through a line 16 and a solvent, such as cyclohexane, is fed to the reaction zone through a line 17. A suitable temperature is maintained in the reaction zone to provide the desired reaction product, for example, polyethylene.

Also suitable are catalysts which have two or more components, where one component is an organo-metal compound, metal hydride or a Group I, II or III metal and the other component is a Group IV to VI metal compound. An organic halide or metal halide where the organic halide has 30 or less carbon atoms can be used advantageously as a third catalyst component. Specific examples of such catalyst systems are:

(a) Aluminum trialkyls, e.g., triethylaluminum or triisobutyl aluminum and the tetravalent metal halides of the type represented by titanium tetrachloride;

(b) An organic halide (such as ethyl bromide), a Group IV inorganic halide (such as titanium tetrachloride), and a low valence metal selected from the group consisting of alkali metals, beryllium, magnesium, zinc, cadmium, mercury, aluminum, gallium, indium and thallium, for example, magnesium, ethyl bromide and titanium tetrachloride, as such, or with the addition of metallic aluminum;

(c) A Group IV halide, for example, titanium tetrachloride, and a low valence metal identified in (b), for example, sodium or magnesium;

(d) A mixture of titanium hydride and a metallo-organic compound exemplified by aluminum alkyl halide, i.e., a mixture of titanium hydride and aluminum sesquichloride;

(e) A mixture of a derivative selected from the oxides of molybdenum, alkali metal and ammonium molybdates, and a metallic-organic compound or halide exemplified by triisobutylaluminum and isobutylaluminum dichloride;

(f) A chromyl halide and at least one of the following: (1) a metal hydride or an organometal compound, (2) an organometal halide, and (3) a mixture of an organic halide and a metal, for example, chromyl chloride, ethyl bromide and magnesium;

(g) (1) A titanium derivative, (2) a complex hydride and (3) a halide of aluminum, for example, tetrabutyl titanate, lithium aluminum hydride and aluminum chloride;

(h) (1) A halide of titanium, zirconium, hafnium, or germanium, (2) a hydride selected from the group consisting of hydrides of aluminum, gallium, indium and thallium and complexes of said hydrides with alkali metal hydrides and (3) an organic halide, for example, titanium tetrachloride, lithium aluminum hydride and ethyl bromide.

From the reaction zone 14, the effluent passes through a line 19 to a catalyst separation zone 20 wherein catalyst and, if desired, some of the solvent are separated from the effluent and withdrawn through the respective lines 21 and 22.

The effluent from the zone 20, which contains small amounts of residual catalyst, passes through line 23 to a solvent removal zone and/or product utilization.

A radiation detector 24, such as a Geiger-Muller counter or scintillometer, is placed adjacent the product line to measure the radioactivity of the product resulting from the radioactive tracer incorporated in such residual catalyst as may remain in the product. The detector 24 produces a pulse output, the frequency of which is proportional to the amount of radioactive material present.

The signals from the detector 24 are passed through an amplifier 25 to a discriminator 26 which produces a signal whose amplitude is proportional to the frequency of the detected pulses and, thus, to the radioactivity of the product. A suitable discriminator circuit for this purpose is shown at pages 585–586 of Terman, Radio Engineer's Handbook, McGraw-Hill Book Company, Inc., 1943.

The output of the discriminator 26 is fed to a recorder-alarm device 27.

It will be apparent that, as a batch of catalyst is used up, the radioactivity of the tracer element decreases. In accordance with the invention, this decrease in activity is compensated for so that the signal to the recorder-alarm device 27 is directly proportional to the amount of residual catalyst in the reaction product.

To this end, a portion of the catalyst incorporating the radioactive tracer is placed in a vessel 28 adjacent a second radiation detector 29. Signals from this detector are fed through an amplifier 30 and a discriminator 31 to the recorder-alarm device 27 in opposition to the signals from the channels 24, 25 and 26. The system is calibrated so that the resultant signal initially represents a known quantity of residual catalyst in the polymer. Thereafter, as the activity of the tracer material in the product decreases, a similar decrease occurs in the radioactivity of the material in the vessel 28 and, hence, in the amplitude of the opposing signal fed to the unit 27. Thus, the output of the device 27 is directly proportional to the amount of residual catalyst in the product. If the isotope has a long half life, such as 50 years or more, sufficiently accurate results can be obtained without compensating for the decay of the radioactive material.

The unit 27 can incorporate an alarm device to provide a visual or audible signal when the radioactivity of the product indicates an amount of residual catalyst above specification for the material. Alternatively, or in conjunction with the alarm feature, a continuous record can be obtained of the quantity of catalyst present in the reaction product.

Figure 2:
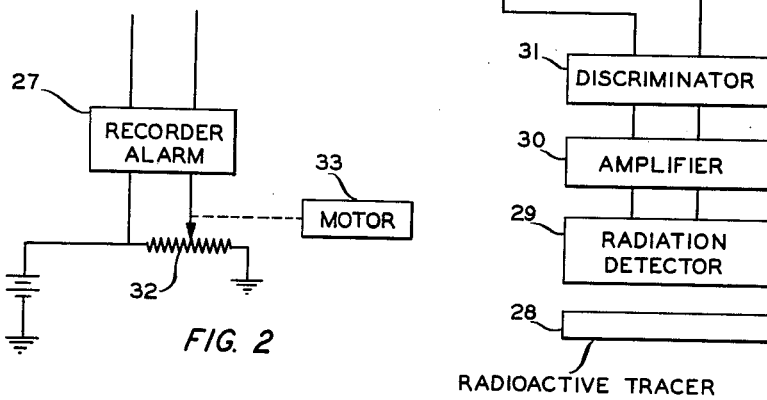
FIGURE 2 is a block diagram of a modification of the invention utilizing a different method of correcting for the decay of the radioactive tracer.
Figure 3:
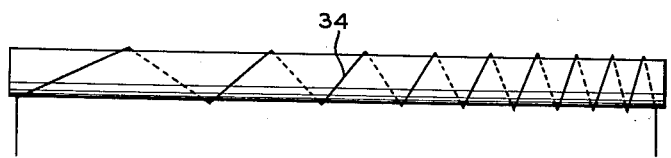
FIGURE 3 is a view of a resistance element suitable for use in the circuit of FIGURE 2.

In the system of FIGURE 2, the decline in radioactivity of the tracer is compensated for in a different manner. In this case, the opposing signal appears between the contactor and one fixed contact of a potentiometer 32, and this signal is fed to the input of the recorder-alarm device 27 in opposition to the signal from the discriminator 26, FIGURE 1. The contactor of the potentiometer 32 is mechanically connected to a constant speed motor 33 so that the opposition signal continuously decreases. As shown by FIGURE 3, the resistance element 34 of the potentiometer is tapered in accordance with the decay curve of the particular radioactive isotope utilized so that the opposition signal decreases in the same way as the radioactivity of the tracer added to the catalyst. Initially, the potentiometer is set to a value representing the initial activity of the radioactive isotope in the catalyst, and thereafter, it produces a signal representing the activity of the radioactive material as it decays. The result is that the signal produced by the unit 27 is directly proportional to the amount of residual catalyst in the reaction product.

From the foregoing discussion, it will be apparent that I have achieved the objects of the invention in providing a simple and reliable method for measuring the amount of residual catalyst in the product of a catalytic reaction. While the invention has been described in connection specifically with the polymerization of ethylene or other olefins utilizing a chromium oxide or silica-alumina catalyst or an organometal catalyst, it will be apparent that the method is applicable to various types of catalytic reactions. As examples, there may be mentioned, the alkylation of olefins and aromatics with an aluminum chloride catalyst, the mass polymerization of butadiene utilizing a sodium catalyst, or the cracking of hydrocarbon materials utilizing a fluidized bed catalyst. In the latter instance, application of the method of the invention provides an accurate determination of the amount of catalyst particles entrained in the converted hydrocarbon vapors.

While the invention has been described in connection with present, preferred embodiments thereof, it is to be understood that this description is illustrative only and is not intended to limit the invention.

I claim:

1. The method of determining the quantity of granular catalyst present in the product of a catalytic reaction which comprises adding a predetermined amount of a radioactive tracer material to a batch of granular catalyst prior to conducting said catalytic reaction, said tracer corresponding to at least one ingredient of said catalyst, catalytically converting a 1-olefin feed with said granular catalyst, substantially separating said catalyst from the effluent from said catalytic reaction producing a signal representative of the radioactivity of the substantially catalyst-free effluent from the catalytic process, producing a signal proportional to the decay in activity of the radioactive tracer material, and combining said signals to produce a resultant output signal in accordance with a calibration that correlates radioactivity with the amount of catalyst in the effluent so that said resultant output signal is represenative of the quantity of granular catalyst present in said effluent.

2. The method of determining the quantity of granular catalyst present in the product of a catalytic reaction which comprises in sequence, adding a predetermined amount of a radioactive tracer material to a batch of granular catalyst, said tracer corresponding to at least one ingredient on said catalyst, catalytically converting an ethylene feed with said granular catalyst, substantially separating said catalyst from the effluent from said catalytic reaction, producing a signal representative of the radioactivity of the substantially catalyst-free effluent from the catalytic process, producing a signal proportional to the decay in activity of the radioactive tracer material, and combining said signals to produce a resultant output signal in accordance with a calibration that correlates radioactivity with the amount of catalyst in the effluent so that said resultant output signal is representative of the quantity of granular catalyst present in said effluent.

3. The method of determining the amount of catalyst present in a polymer produced by a liquid-phase polymerization reaction in the presence of a granular catalyst which comprises, in sequence, admixing a predetermined amount of a radio-active tracer material with a batch of said catalyst, said tracer corresponding to one of the elements of said catalyst, polymerizing a feed stock in liquid phase in the presence of said catalyst, separating catalyst from the reactor effluent, producing a signal representative of the radioactivity of said separated effluent, producing a signal representative of the radioactivity of a sample of said batch of catalyst, the strength of each of said signals thus decreasing in accordance with the radioactive decay of the radioactive isotope therein, and combining said signals to produce a resultant signal representative of the amount of residual catalyst in said polymer.

4. The process of claim 3 wherein the catalyst is chromium oxide supported on silica-alumina, the radioactive tracer is chromium-51 and the polymer is polyethylene.

5. The method of determining the amount of catalyst present in a polymer produced by a liquid-phase polymerization reaction in the presence of a granular catalyst which comprises in sequence, admixing a predetermined amount of a radio-active tracer material with a batch of said catalyst, said tracer corresponding to one of the elements of said catalyst, polymerizing a feed stock in liquid phase in the presence of said catalyst, separating catalyst from the reactor effluent, impressing a voltage across a potentiometer, the resistance element of which is tapered in accordance with the decay curve of the radioactive isotope in said batch of catalyst, picking off a signal between a fixed terminal and the contactor of said potentiometer which decreases in accordance with the radioactive decay of said isotope, and combining said signals to produce a resultant signal representative of the amount of residual catalyst in said polymer.

6. The process of claim 5 wherein the catalyst is chromium oxide supported on silica-alumina, the radioactive tracer is chromium-51 and the polymer is polyethylene.

7. The method of determining the quantity of catalyst present in the product of a catalytic reaction which comprises, in sequence, adding a predetermined amount of a radioactive tracer material to a batch of catalyst, said tracer corresponding to at least one ingredient of said catalyst, catalytically converting a feed with said catalyst, substantially separating said catalyst from the effluent from said catalytic reaction, producing a signal representative of the radioactivity of the effluent from the catalytic process, producing a signal proportional to the decay in activity of the radioactive tracer material, and combining said signals to produce a resultant output signal in accordance with a calibration that correlates radioactivity with the amount of catalyst in the effluent so that said resultant output signal is representative of the quantity of catalyst present in said effluent.

References Cited in the file of this patent

UNITED STATES PATENTS

| | | |
|---|---|---|
| 2,365,553 | Hill | Dec. 19, 1944 |
| 2,534,352 | Herzog | Dec. 19, 1950 |
| 2,674,363 | Graham | Apr. 6, 1954 |
| 2,675,483 | Leighton | Apr. 13, 1954 |
| 2,680,900 | Lindeman | June 15, 1954 |
| 2,701,785 | Lechthaler | Feb. 8, 1955 |
| 2,744,199 | Juterbock | May 1, 1956 |
| 2,761,976 | Obermaier et al. | Sept. 4, 1956 |

OTHER REFERENCES

Petroleum Processing, September 1950, pages 941–945.

Hull: Using Tracers in Refinery Control, Nucleonics, vol. 13, No. 4, pages 18–21, April 1955.

Wagner et al: Tracers Locate Entrainment, Nucleonics, vol. 14, No. 4, pages 78–83, 128, April 1956.